Patented June 29, 1926.

1,590,265

UNITED STATES PATENT OFFICE.

RICHARD THURM, OF SAGINAW, MICHIGAN.

PROCESS FOR PRODUCING ORGANIC CHLORIDES.

No Drawing.   Application filed August 20, 1925.   Serial No. 51,480.

This invention relates to a process for producing organic chlorides, such as chloroform, tetrachlorethylene and the like, and has for its object to manufacture them at considerably lower costs than was possible with the methods hitherto in use.

For this purpose I compress dry and purified hydrochloric acid gas (HCl) and I compress dry carbon monoxide (CO) and I then mix the compressed gases preferably in the proportion of three volumes of hydrochloric acid gas to one volume of carbon monoxide; the volumes measured at the same pressure and temperature. I use a pressure preferably ranging between 1000 lbs. to 3000 lbs. per square inch and subject the gas mixture at this pressure to the contact process, the vessel containing the contact mass, the contact itself and the gas mixture passing therethrough I keep during the operation at a temperature preferably between 450° F and 750° F.

As contact mass I use metal oxides or metal chlorides or a mixture of both. For instance, I use a mixture of equal parts by weight of granulated nickel oxide (NiO), granulated aluminum oxide ($Al_2O_3$) and granulated copper oxide (CuO), but any other contact mass answering the purpose may be employed.

The gas mixture leaving the contact vessel is cooled, whereby the organic chlorides produced, mainly chloroform, tetrachlorethylene and the like are condensed. This reaction may be described by the following formulæ:—

(1) 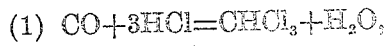

and (2) 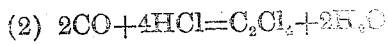

The uncondensed compressed gases are then passed again through the contact vessel. Fresh dry compressed hydrochloric acid gas and dry compressed carbon monoxide are, gradually as the occasion requires, added to the recirculating uncondensed gases in order to maintain the proper pressure and the proper proportion of the reacting gases in the contact vessel.

The condensed products of reaction, mainly chloroform and tetrachlorethylene, are removed from the system and separated from each other according to well-known methods.

I claim:

1. The method of producing chloroform, tetrachlorethylene and the like, which consists in compressing dry and purified hydrochloric acid gas and pure and dry carbon monoxide, to a pressure of from 1000–3000 lbs. per square inch, in mixing the compressed gases and in treating the mixture of compressed gases by the contact process at a high temperature, that is above 400° F.

2. The method of producing chloroform, tetrachlorethylene and the like, which consists in compressing dry and purified hydrochloric acid gas and pure and dry carbon monoxide, to a pressure of from 1000–3000 lbs. per square inch, in mixing the compressed gases in a vessel containing a contact mass and kept with its contents during the operation at a temperature ranging between 450 and 750° F., and in cooling the gases which leave the vessel, whereby the products of reaction, chloroform, tetrachlorethylene etc. are condensed, the uncondensed gases being recirculated through the contact vessel under addition of dry compressed hydrochloric acid gas and dry carbon monoxide to maintain therein the proper pressure and the proper proportion of the reacting gases.

3. The method of producing chloroform, tetrachlorethylene and the like, which consists in compressing dry and purified hydrochloric acid gas and pure and dry carbon monoxide, to a pressure of from 1000–3000 lbs. per square inch, in mixing the compressed gases in theoretical proportions and in treating the mixture of compressed gases by the contact process, at a high temperature, that is above 400° F., the contact mass containing equal parts by weight of granulated nickel oxide (NiO), granulated aluminum oxide ($Al_2O_3$) and granulated copper oxide (CuO).

4. The method of producing chloroform, tetrachlorethylene and the like, which consists in compressing dry and purified hydrochloric acid gas and pure and dry carbon monoxide, to a pressure of from 1000 to 3000 lbs. per square inch, in mixing the compressed gases in theoretical proportions and in treating the mixture of compressed gases by the contact process, at a high temperature, that is above 400° F., the contact mass containing for instance equal parts by weight of granulated nickel oxide (NiO) granulated nickel chloride ($NiCl_2$), granulated copper oxide (CuO), granulated copper chloride ($CuCl_2$), granulated aluminum oxide ($Al_2O_3$) and granulated aluminum chloride ($Al_2Cl_6$).

RICHARD THURM.